(12) United States Patent
Ryle et al.

(10) Patent No.: US 7,653,526 B1
(45) Date of Patent: Jan. 26, 2010

(54) METHOD AND SYSTEM FOR EMULATING AN ETHERNET LINK OVER A SONET PATH

(75) Inventors: Thomas Eric Ryle, Raleigh, NC (US); Sanjeev Rampal, Cary, NC (US); Jimmy Philip Ervin, Raleigh, NC (US); Charles Allen Carriker, Jr., Cary, NC (US); Russell Eugene Gardo, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 588 days.

(21) Appl. No.: 10/222,134

(22) Filed: Aug. 16, 2002

(51) Int. Cl.
*G06F 9/455* (2006.01)
*H04L 12/56* (2006.01)
*H04L 12/28* (2006.01)
*H04L 12/26* (2006.01)
*G06F 15/177* (2006.01)

(52) U.S. Cl. .............. 703/23; 703/25; 370/395.52; 370/395.53; 370/242; 370/236.2; 709/223

(58) Field of Classification Search ......... 370/464–467, 370/236.2, 242, 395.52, 395.53; 395/5, 50–60; 709/235; 703/1–28, 35
See application file for complete search history.

(56) References Cited

U.S. PATENT DOCUMENTS

| | | | | |
|---|---|---|---|---|
| 5,757,774 | A * | 5/1998 | Oka ........................... | 370/242 |
| 6,023,774 | A * | 2/2000 | Minagawa .................. | 370/242 |
| 6,222,848 | B1 * | 4/2001 | Hayward et al. ............ | 370/412 |
| 6,366,556 | B1 * | 4/2002 | Ballintine et al. ........... | 370/216 |
| 6,400,730 | B1 | 6/2002 | Latif et al. .................. | 370/466 |
| 6,430,201 | B1 * | 8/2002 | Azizoglu et al. ............ | 370/535 |
| 6,449,263 | B2 | 9/2002 | Harris et al. ................ | 370/316 |
| 6,681,248 | B1 * | 1/2004 | Sears et al. ................. | 709/223 |
| 6,760,302 | B1 * | 7/2004 | Ellinas et al. ............... | 370/228 |
| 6,782,009 | B1 * | 8/2004 | Giorgetta et al. ........... | 370/539 |
| 6,795,451 | B1 * | 9/2004 | Giorgetta et al. ........... | 370/510 |
| 6,826,196 | B1 * | 11/2004 | Lawrence ................... | 370/466 |
| 6,839,320 | B2 * | 1/2005 | Paridaens et al. ........... | 370/230 |
| 6,892,336 | B1 * | 5/2005 | Giorgetta et al. ........... | 714/704 |
| 6,944,165 | B2 * | 9/2005 | Fujiyama et al. ............ | 370/400 |
| 6,952,395 | B1 * | 10/2005 | Manoharan et al. ......... | 370/219 |
| 7,020,814 | B2 * | 3/2006 | Ryle et al. .................. | 714/712 |
| 7,031,341 | B2 * | 4/2006 | Yu ............................. | 370/469 |
| 7,046,665 | B1 * | 5/2006 | Walrand et al. ............. | 370/392 |
| 7,085,224 | B1 * | 8/2006 | Oran .......................... | 370/216 |

(Continued)

OTHER PUBLICATIONS

Harpreet Chohan, "Ethernet-over-Sonet Tutorial: Part 1", CommsDesign, pp. 1-6, Apr. 18, 2002.*

(Continued)

*Primary Examiner*—Kamini S Shah
*Assistant Examiner*—Akash Saxena
(74) *Attorney, Agent, or Firm*—Cindy Kaplan (57) ABSTRACT

A method and system for emulating an Ethernet link over a Sonet path to provide link integrity is disclosed. The method generally includes receiving an error code at a local Ethernet port upon detection of a link failure at a remote Ethernet port. The error code is received over a Sonet path in a Sonet path overhead. If the error code is still present after a specified period of time, the local Ethernet port is disabled. Methods for providing link stability and link availability are also disclosed.

20 Claims, 11 Drawing Sheets

U.S. PATENT DOCUMENTS

| | | | | |
|---|---|---|---|---|
| 7,113,699 | B1* | 9/2006 | Bhate et al. | 398/15 |
| 7,180,899 | B2* | 2/2007 | De Silva et al. | 370/395.31 |
| 7,239,638 | B2* | 7/2007 | Wisler et al. | 370/395.4 |
| 7,366,181 | B2* | 4/2008 | Havala | 370/395.53 |
| 7,430,210 | B2* | 9/2008 | Havala et al. | 370/395.53 |
| 7,505,481 | B2* | 3/2009 | He et al. | 370/466 |
| 2003/0039207 | A1* | 2/2003 | Maeda et al. | 370/216 |
| 2003/0056017 | A1* | 3/2003 | Gonda | 709/251 |
| 2003/0193962 | A1* | 10/2003 | Primrose et al. | 370/411 |
| 2004/0027076 | A1* | 2/2004 | Shimizu | 318/139 |
| 2004/0073717 | A1* | 4/2004 | Cline et al. | 709/250 |
| 2004/0252633 | A1* | 12/2004 | Acharya et al. | 370/216 |
| 2005/0010849 | A1* | 1/2005 | Ryle et al. | 714/758 |
| 2005/0249119 | A1* | 11/2005 | Elie-Dit-Cosaque et al. | 370/236 |
| 2009/0046575 | A1* | 2/2009 | Miyazaki | 370/216 |
| 2009/0190610 | A1* | 7/2009 | Pirbhai et al. | 370/466 |

OTHER PUBLICATIONS

Jacob Slonim, "Advances in Data Communications Management", John Wiley & Sons, vol. 2, pp. 26-39.*

Harpreet Chohan, Asis Mukhopadhyay, and Robert Schwaber, TranSwitch Corporation; "Ethernet-over-Sonet Tutorial: Part 2"; Apr. 25, 2002 (4:01 AM); CommDesign; URL: http://www.com-msdesign.com/showArticle.jhtml?articleID=16504657; pp. 1-6.*

Juniper Networks; Chapter 15 "Locate SONET Alarms and Errors" created Apr. 22, 2002; p. 151-170 and document properties page (Total 21 pages)—See Google Search notes for the source of the document.*

TCPIP Illustrated vol. 1; W. Richard Stevens; p. 21-23; ISBN 0201633469, © 1994.*

RFC 1622 "Pip Header Processing" Network Working Group, May 1994.

RFC 2615 "PPP Over SONET/SDH" Network Working Group, Jun. 1999.

* cited by examiner

| Timer | Description | Default Setting |
|---|---|---|
| 1 | Sonet Path up wait after provisioning | 500ms |
| 2 | Gigabit Ethernet Link up timeout after activation | 2.5 sec |
| 3 | Sonet Path error soaking timeout | 200ms |
| 4 | Sonet Path stable timeout after error | 100ms |
| 5 | Gigabit Ethernet Link stable timeout | 500ms |
| 6 | PDI active condition detected soaking time | 15ms |
| 7 | PDI inactive condition detected soaking time | 15ms |

FIG. 5

| State | Transitions | | |
|---|---|---|---|
| | Next State | Cause of Transition | Action Taken on Transition |
| INACTIVE | 1) TRANSPORT_INIT | Sonet Circuit Created | enable Gige port transmitter |
| TRANSPORT_INIT | 1) TRANSPORT_ERROR | Sonet path error detected (timer 3) | Send pdi code to remote end station |
| | 2) GIGE_LINK_INIT | Sonet Path Up Wait completed (timer 1) and no sonet path errors (timer 3) | none |
| GIGE_LINK_INIT | 1) TRANSPORT_ERROR | Sonet Path error detected (timer 3) | Send pdi code to remote end station |
| | 2) REMOTE_ERROR | Remote PDI error code detected (timer 6) | Disable Gige port transmitter |
| | 3) GIGE_LINK_DOWN | Gige port detected Inactive (timer 2) | Send pdi code to remote end station |
| | 4) GIGE_LINK_ACTIVE | Gige Link Detected Active | Enable traffic between sonet and gige port. |
| GIGE_LINK_ACTIVE | 1) TRANSPORT_ERROR | Sonet Path error detected (timer 3) | Send pdi code to remote end station, Disable gige port transmitter and receiver |
| | 2) REMOTE_ERROR | Remote PDI error code detected active (timer 6) | Disable gige port transmitter |
| | 3) GIGE_LINK_DOWN | Gige port detected inactive (no timer used) | Send pdi code to remote end station |
| TRANSPORT_ERROR | 1) GIGE_LINK_INIT | Sonet circuit error free and stable detected (timer 4) | Enable gige port transmitter, and remove pdi code to remote end station |
| REMOTE_ERROR | 1) GIGE_LINK_INIT | Remote PDI error code detected inactive (timer 7) | Enable gige port transmitter |
| GIGE_LINK_DOWN | 1) GIGE_LINK_ACTIVE | Gige port detected active and stable (timer 5) | Remove pdi code to remote end station |
| All States (except INACTIVE) | INACTIVE | Sonet Circuit deleted | Remove pdi code to remote end (if driven), disable gige port, and disable traffic between gige port and sonet. |

| Flag | Address | Control | Protocol | Ethernet Payload | HDLC CRC | Flag |

METHOD AND SYSTEM FOR EMULATING AN ETHERNET LINK OVER A SONET PATH

BACKGROUND OF THE INVENTION

The present invention relates generally to digital communication networks, and more specifically, to Ethernet transport over a Sonet path.

SONET/SDH and optical fiber have emerged as significant technologies for building large scale, high speed, Internet Protocol (IP) based networks. SONET and SDH are a set of related standards for synchronous data transmission over fiber optic networks. SONET is short for Synchronous Optical Network and SDH is an acronym for Synchronous Digital Hierarchy. SONET/SDH is currently used in wide area networks (WAN) and metropolitan area networks (MAN). A Sonet system consists of switches, multiplexers, and repeaters, all connected by fiber. The connection between a source and destination is called a path.

One standard that describes the interconnection of computer devices in network communication is IEEE (Institute of Electrical and Electronic Engineers) standard 802.3, commonly referred to as Ethernet (also adopted as International Standard ISO/IEC 8802-3). The Ethernet system includes an Ethernet frame that consists of a standardized set of bits used to carry data over the system.

Ethernet transport over Sonet products typically map one or more Ethernet ports to a Sonet path for transport across a Sonet network. There is typically an Ethernet transport over Sonet product at each end of a Sonet path. A method is needed for the Ethernet over Sonet transport path to behave transparently, so that its behavior emulates a direct Ethernet connection between end stations connected to the Ethernet over Sonet equipment.

The implementation should also be resilient to Sonet switches (i.e., from UPSR, BLSR, etc.), within the path which can cause traffic disruption. In order to do this, the implementation should provide for minimal frame loss during Sonet switches. Also, it should not bring down links during a Sonet switchover unless there is a permanent failure condition within the Sonet transport path.

Conventional methods of determining whether a remote end station is down (i.e., loss of Ethernet transport) are performed through layer 2 connection level protocols such as PPP signaling. However, this is inefficient and often requires overhead for implementing additional protocols. Other solutions may indicate a local port down state to the remote port by driving AISP on the Sonet path. This method may result in a technician assuming that there is a Sonet circuit failure within the network, when there is actually no circuit failure. Other solutions may also be affected by a Sonet switch within the path. This can cause extraneous link up and down cycling which is detrimental to the data network attached to the Ethernet over Sonet transport path. These solutions typically do not provide a method for quickly shutting off the flow of input Ethernet traffic at the first detection of a local or remote Sonet path failure.

SUMMARY OF THE INVENTION

A method and system for emulating an Ethernet link over a Sonet path are disclosed.

In one aspect of the invention, the method generally includes receiving an error code at a local Ethernet port upon detection of a link failure at a remote Ethernet port. The error code is received over a Sonet path in a Sonet path overhead. If the error code is still present after a specified period of time, the local Ethernet port is disabled.

In another aspect of the invention, a method for emulating an Ethernet link over a Sonet path generally comprises detecting a remote or local Sonet path failure and waiting a specified period of time. The Ethernet port is disabled if the Sonet path failure is still present after the period of time has passed. The period of time is sufficiently long to prevent inadvertent disabling of the Ethernet port due to transient Sonet error conditions In yet another aspect of the invention, a system for emulating an Ethernet link over a Sonet path generally comprises a local Ethernet port having an ingress side coupled to an Ethernet link and an egress side coupled to a Sonet path. The system further includes a processor configured to receive an error code detection of a link failure at a remote Ethernet port. The error code is received over the Sonet path in a Sonet path overhead. The processor is further configured to wait a specified period of time and disable the local Ethernet port if the error code is still present after the specified period of time.

In another aspect of the invention, a method for emulating an Ethernet link generally comprises encapsulating an Ethernet frame at a local Ethernet port coupled to a Sonet path and transparently passing the Ethernet frame over the Sonet path in a generally unaltered condition to a remote Ethernet port configured to decapsulate the Ethernet frame.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 6 is a table listing state transitions for the system of FIG. 2.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system set forth herein is used to emulate an Ethernet link over a Sonet path. The emulated Ethernet link allows Ethernet frames to be passed transparently over the Sonet path in a generally unaltered condition. As described in detail below, the system provides for link integrity through the use of error codes sent between Ethernet ports, link stability by using timers to prevent disabling ports due to transient Sonet errors, and link availability (i.e., carrier class availability or errorless reset) by allowing the emulated link to be unaffected by card resets or software upgrades. The system is preferably configured to provide flow control by matching the Ethernet speed to the speed of traffic on the Sonet path.

Figure 1:
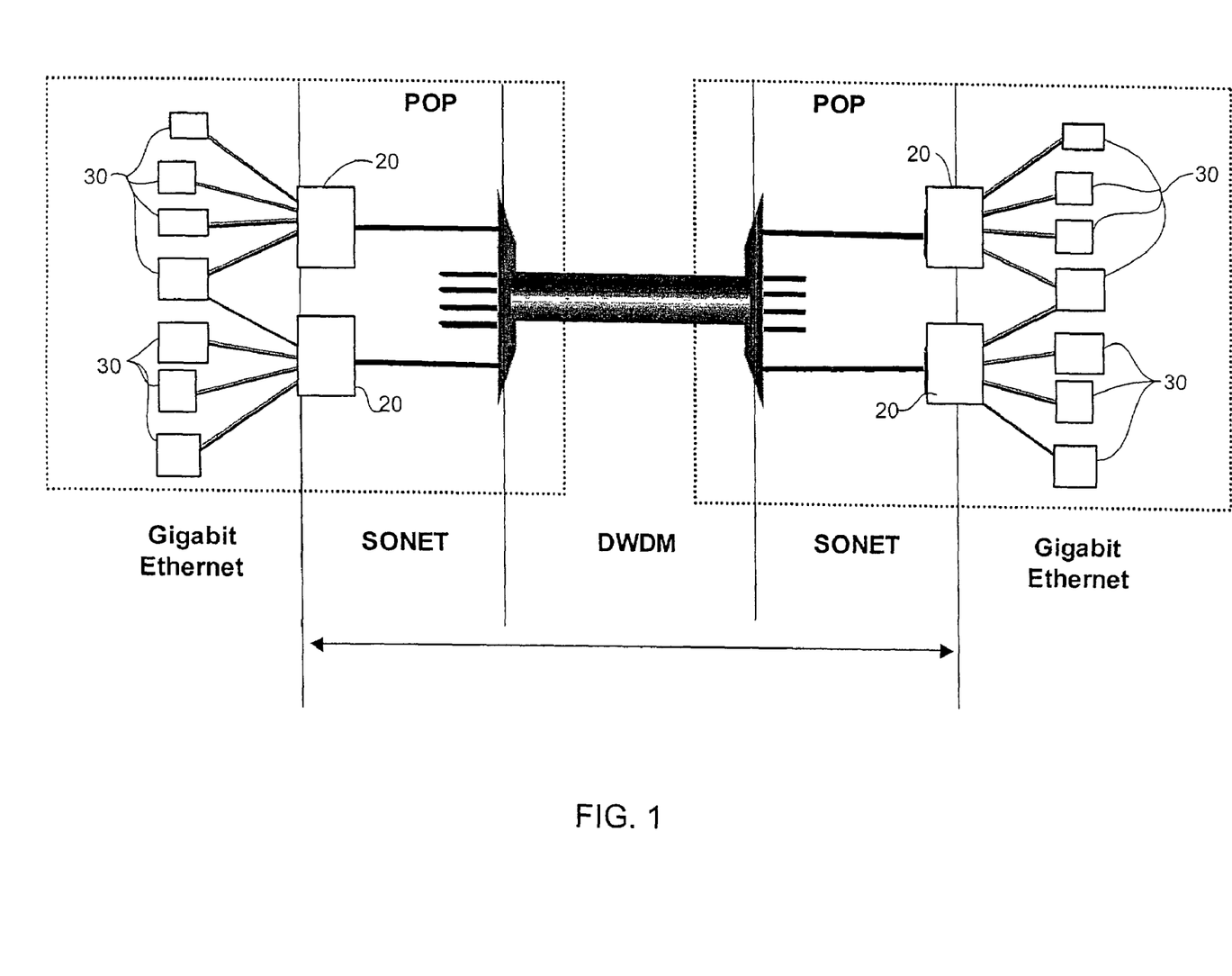
FIG. 1 is a diagram illustrating an exemplary network employing a system of the present invention.
Figure 2:
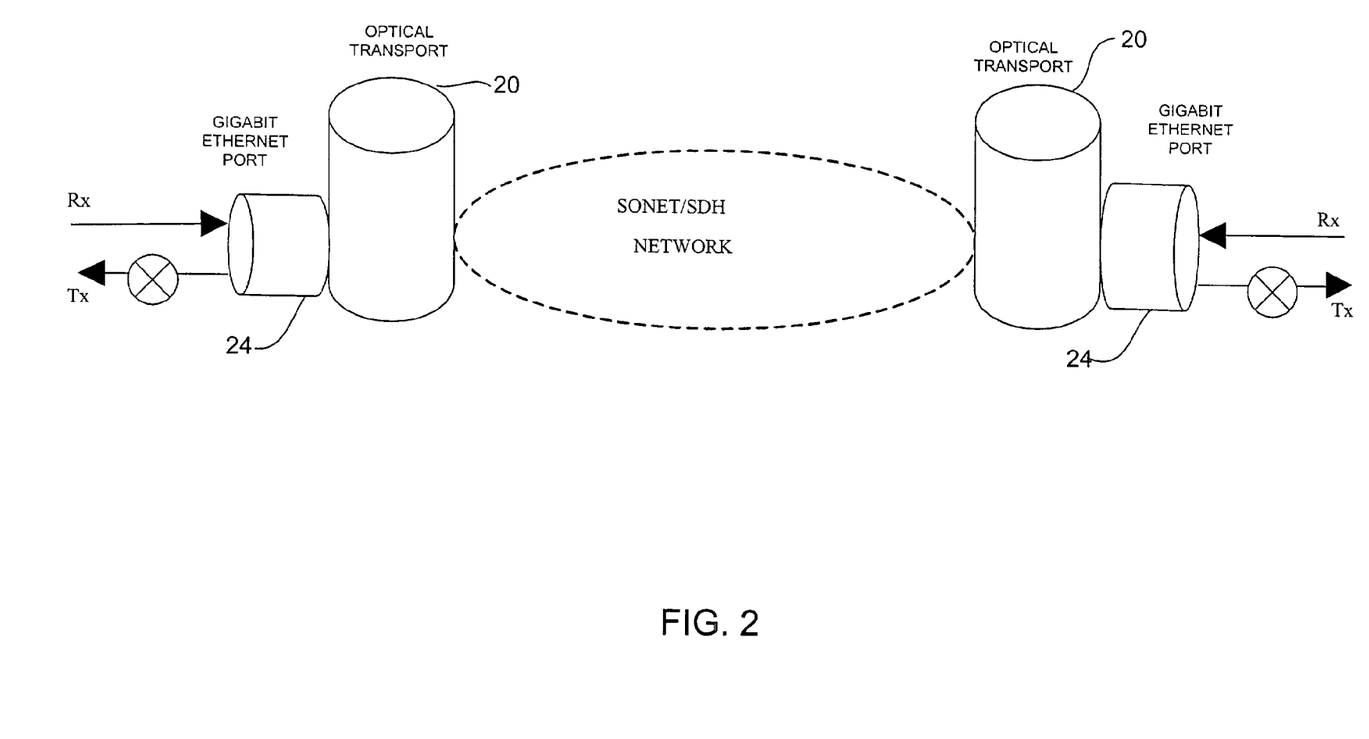
FIG. 2 is a diagram of a portion of the system of FIG. 1.
Figure 3:
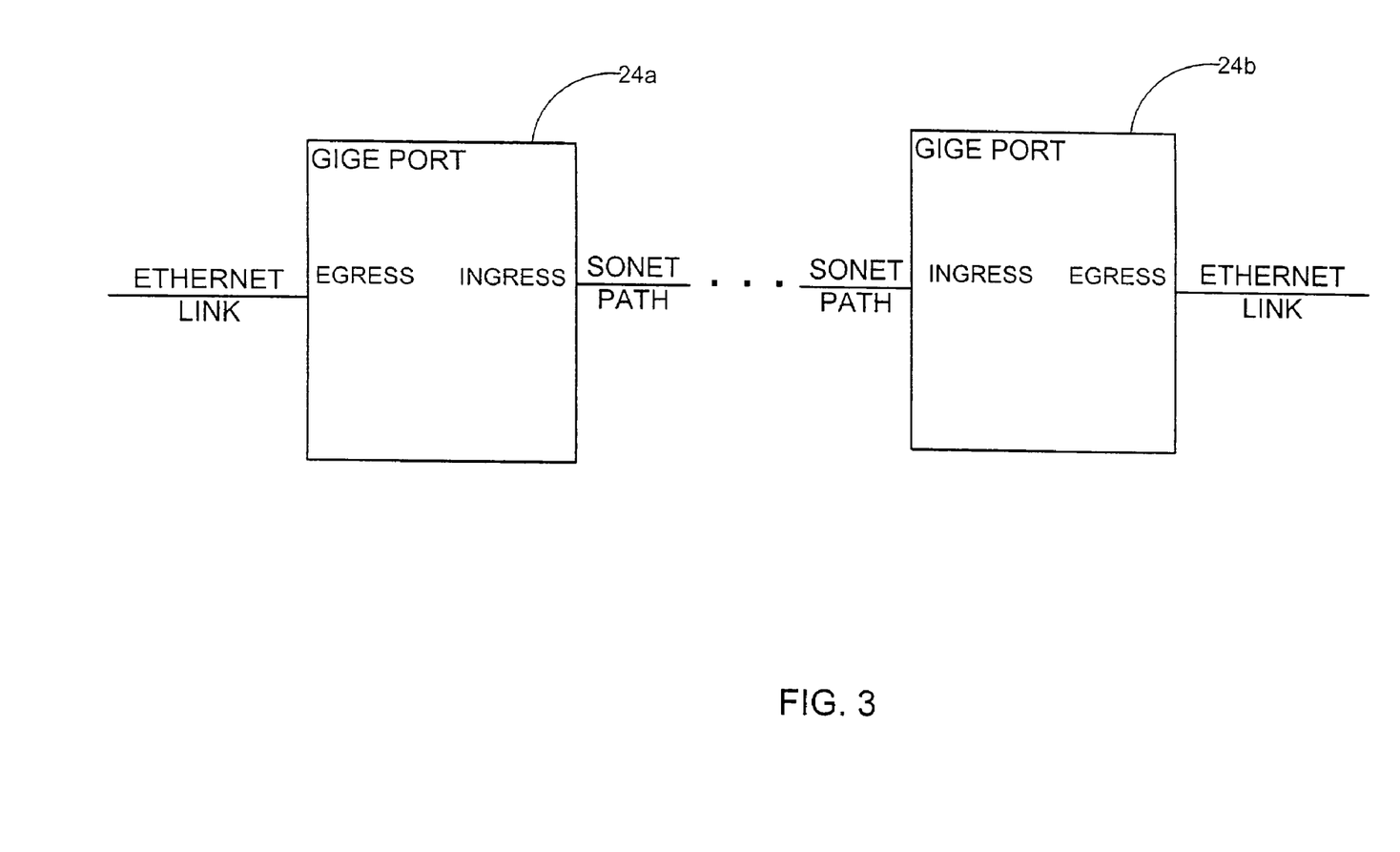
FIG. 3 is a diagram of Gigabit Ethernet ports of the system of FIG. 2.

The present invention operates in the context of a data communication network including multiple network elements. As shown in FIG. 1, the system may include a DWDM (Dense Wavelength Division Multiplexing) network connecting two Sonet networks. Each Sonet network is coupled to a Gigabit Ethernet network. The DWDM network combines multiple optical signals so that they can be amplified as a group and transported over a single fiber to increase capacity. Each signal can be at a different rate and in a different format. DWDM applications include ultra-high bandwidth long haul as well as ultra-high-speed metropolitan or inner city-networks, and at the edge of other networks such as Sonet. An optical transport platform 20, such as ONS 15454 (available from Cisco Systems, Inc.) may be used at the Sonet and Ethernet interface (FIGS. 1 and 2). The system of the present invention may be located, for example, in a four-port Gigabit Ethernet card (e.g., model G1000-4, available from Cisco Systems, Inc.) incorporated into the optical transport platform 20. The Ethernet paths are connected to network elements 30 such as routers, switches, or other network elements. FIG. 3 shows additional details of Gigabit Ethernet ports (Gige Port) 24a, 24b.

Figure 4A:
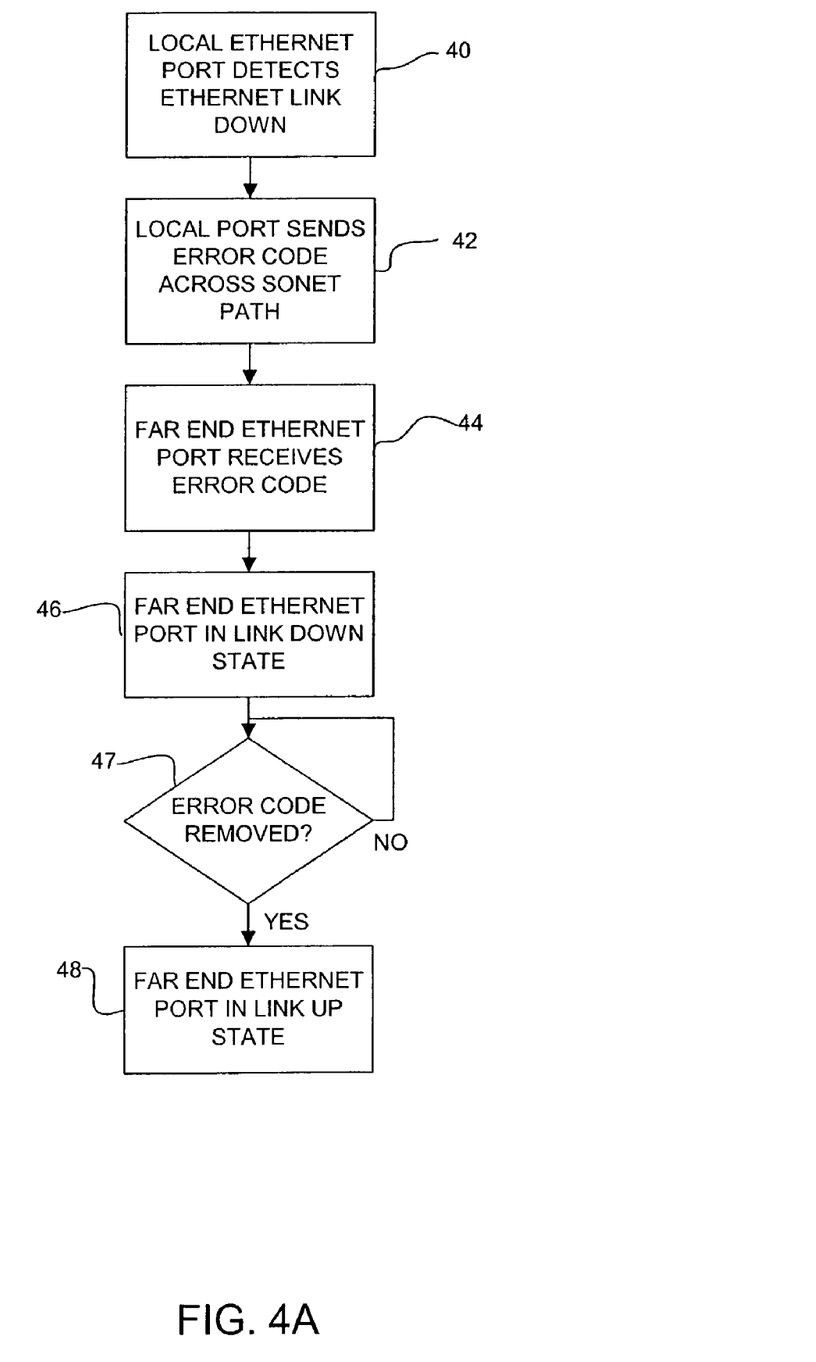
FIG. 4A is a flowchart illustrating a process for shutting down a far end Ethernet port upon detection of a local Ethernet link failure.

FIG. 4A is a flowchart illustrating a process for shutting down a far end Ethernet port 24b when a local Ethernet port 24a detects an Ethernet link failure (FIG. 3). When local port 24a detects that its Ethernet link is in the down state (step 40), a signaling error code is sent across the Sonet path to far end Ethernet port 24b (step 42). The signaling error code is inserted in the Sonet path overhead. The error code may be inserted, for example, in the portion of overhead reserved for user level messaging (e.g., error indications). When Ethernet port 24b detects the signaling error code from port 24a, Ethernet port 24b puts itself in a link down state (steps 44 and 46). As soon as the signaling error code is removed, Ethernet port 24b puts itself in a link up state (steps 47 and 48). When an error code is received, the Ethernet port is only disabled in the Ethernet transmit direction (Tx in FIG. 2) so that the Ethernet error is only propagated unidirectionally. This allows for communication to continue over the emulated Ethernet link in the opposite direction (i.e., from Ethernet port that received error code to the Ethernet port that transmitted the error code (Rx in FIG. 2)) and provides link integrity.

Figure 4B:
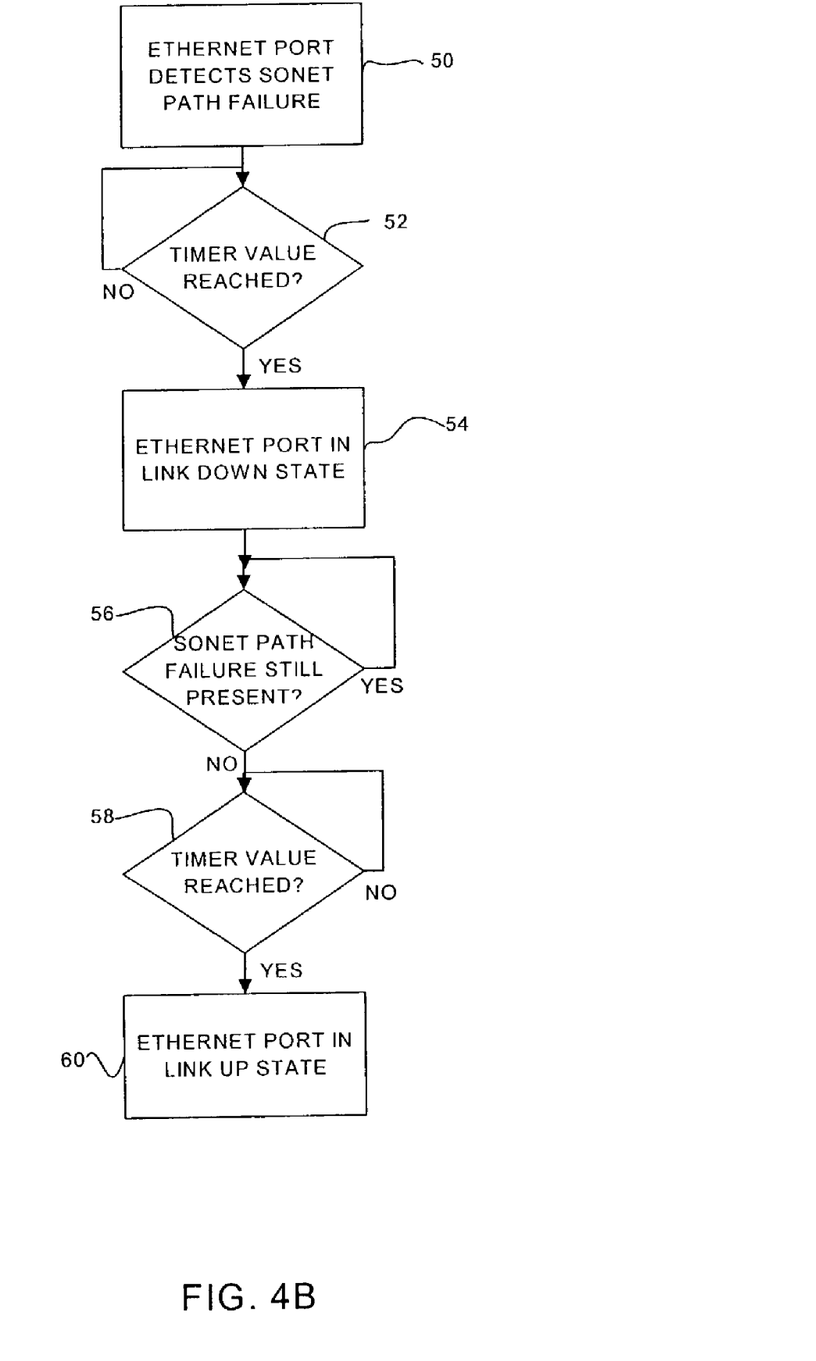
FIG. 4B is a flowchart illustrating a process for shutting down an Ethernet port upon detection of a Sonet path failure.

FIG. 4B is a flowchart illustrating a process for shutting down an Ethernet port when a permanent Sonet path failure is detected. An Ethernet port (24a or 24b) detects a Sonet path failure at step 50. The Ethernet port puts itself in the link down state when it detects a permanent Sonet path failure at the near end (e.g., AISP, LOPP, UNEQP, PLMP) or the far end (RDIP). A timer (timer 3 described below with respect to FIG. 5) is used to determine how long an error condition is detected. After a specified time, it is assumed that the error is permanent and not due to a Sonet switch in the path (steps 52 and 54). The Ethernet port puts itself in the link up state when it detects that the Sonet path failure condition is no longer present. The error condition must be detected for a specified time before the Sonet path is considered stable and the link allowed to be brought up (time 4 described below) (steps 58 and 60).

Ethernet input traffic into the Sonet path is preferably shut off as soon as a Sonet path failure condition is detected at the near end or far end. This provides resiliency during Sonet switches in the transport path. Depending on the amount of buffering at the input, buffers may overflow if the condition persists. Backpressure to the Ethernet client such as "flow control" may also be implemented. Ethernet input traffic into the Sonet path is turned on as soon as the failure condition is removed.

The error signaling code is preferably detected as "active" for a minimum of several milliseconds to prevent false detection during a Sonet path switch (timer 6 described below). If the Ethernet port is already down from a remote error condition, then the removal of the error condition must also be detected for a minimum of several milliseconds to prevent the false detection of "inactive" (timer 7 described below). Additional timers may be used to capture an accurate error signal code.

Figure 5:
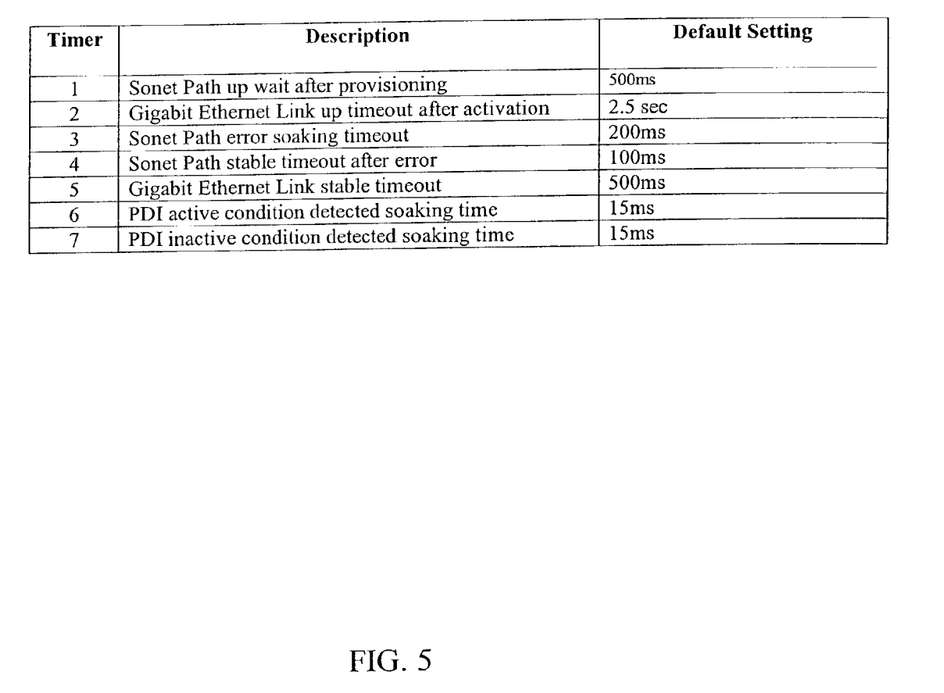
FIG. 5 is a table showing timers used by a state machine of the system of FIG. 2.

As previously discussed, the system includes timers which are used to determine how long an error condition is present (to ensure that a failure is permanent) and how long it is gone (to make sure that the Sonet path is stable before link is brought back up). FIG. 5 lists timers within the system and default settings for the timers. It is to be understood that these settings are only examples and other values may be used without departing from the scope of the invention. Timer 1 provides a delay to wait for the Sonet path after provisioning. Timer 2 is the Gigabit Ethernet link up timeout after activation. Timer 3 is a Sonet path error soaking timeout. This is the time to wait until permanent error is determined. The time period selected is based on worst case transient Sonet error conditions and preferably accounts for extended ring network configurations. Timer 4 is a Sonet path stable timeout after error. Timer 4 measures the time to wait until the Sonet path is considered error free. Timer 5 is a Gigabit Ethernet Link stable timeout and monitors the time to wait until Gigabit Ethernet link is considered up after link down. Timer 6 is the PDI (Payload Detect Indication) active condition detected soaking time and timer 7 is the PDI inactive condition detected soaking time. Timer 7 is only used during transport remote error state (see State Machine description below).

Figure 7:
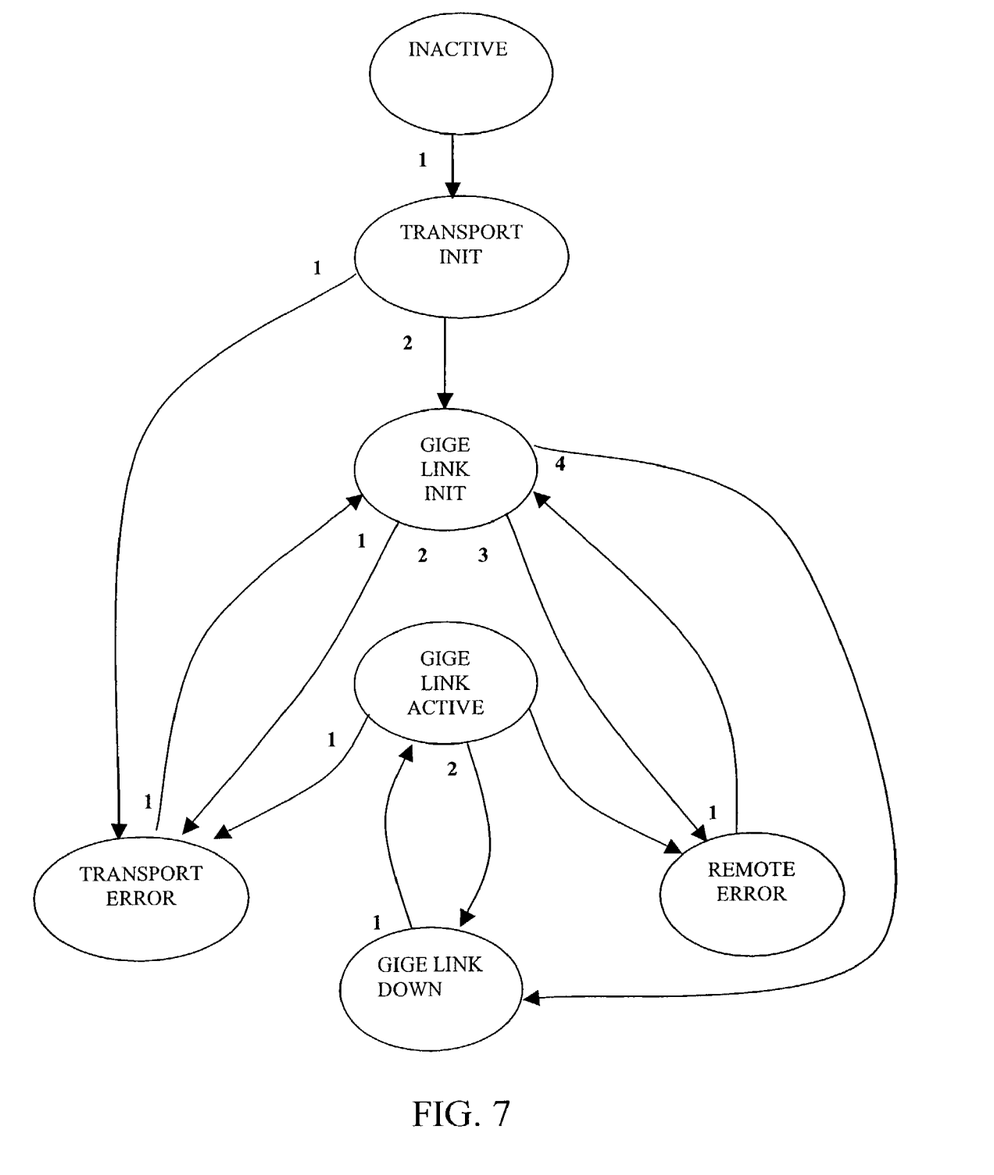
FIG. 7 is a state diagram of the system of FIG. 2.

FIG. 6 lists the state machine transitions shown in the state diagram of FIG. 7. The transition numbers are shown in both FIGS. 6 and 7 and listed in order of priority (with 1 being the highest priority). From inactive, the transport system is initiated. Once the transport system is initiated, the Ethernet link is initiated if there are no transport errors (based on timers 1 and 3 of FIG. 5). After the Ethernet link is initiated, a Sonet path error or remote PDI error can be detected (timers 3 and 6, respectively). Also, the Ethernet port may be detected inactive (timer 2) or the Ethernet link detected active. If the Ethernet link is active, a transport error (timer 3) or remote PDI error (timer 6) may be detected, or the port may be detected inactive. Following a transport error, the Ethernet link may be initiated if the Sonet circuit is error free and stable (based on timer 4). Following a remote error, the Ethernet link may be initiated if the remote PDI error code is detected inactive (timer 7). After the Ethernet link is down, it may become active if the port is detected active and stable (based on timer 5). The inactive state is reached from all other states when the Sonet circuit is deleted The system preferably provides alarms and error messages. For example, an alarm may be used for end to end link integrity signaling. When an Ethernet link is not in active state, a signal label (C2) byte is set to indicate STS payload defect. At the far end, this alarm code point is received from the Sonet path overhead and the Ethernet link is brought down so that the integrity of the end to end Ethernet link is preserved. The end to end path appears as a single Ethernet link to attached Ethernet devices such as switches and routers and the link integrity function enables correct operation of functions which depend on Ethernet link state such as Gigabit Ethernet channel, layer 2, or layer 3 based re-routing.

The signal label (C2) byte is used to indicate a payload detect indication (PDI) condition to the remote station on the Sonet path. An error code (e.g., 0xFC) may be used for this indication. A normal setting (e.g., 0x01) may be used for the C2 byte when no error condition is present.

In one embodiment, 512 Kbytes in each direction (receiving and transmitting) of frame buffering per channel is provided to facilitate scenarios requiring over-subscription (i.e., when Sonet circuit size is less than the STS-24c required for full Gigabit Ethernet line rate). Standard pause frames are generated out towards the Ethernet line when the buffer occupancy exceeds approximately 488 Kbytes in the direction towards the Sonet network.

The Ethernet system includes an Ethernet frame that consists of a standardized set of bits used to carry data over the system. The fields of an Ethernet packet (also referred to as an Ethernet frame) include address fields, a variable size data field that carries from 46 to 1500 (or more (e.g., jumbo frames)) bytes of data, and an error checking field that checks the integrity of bits in the frame to make sure that the frame has arrived intact. The Ethernet frame encapsulates payload data by adding a 14 byte header before the data and appending a 4-byte (32-bit) cyclic redundancy check (CRC) after the data. The entire frame is preceded by a small idle period (the minimum inter-frame gap, 9.6 microseconds) and an 8 byte preamble.

Figure 8:
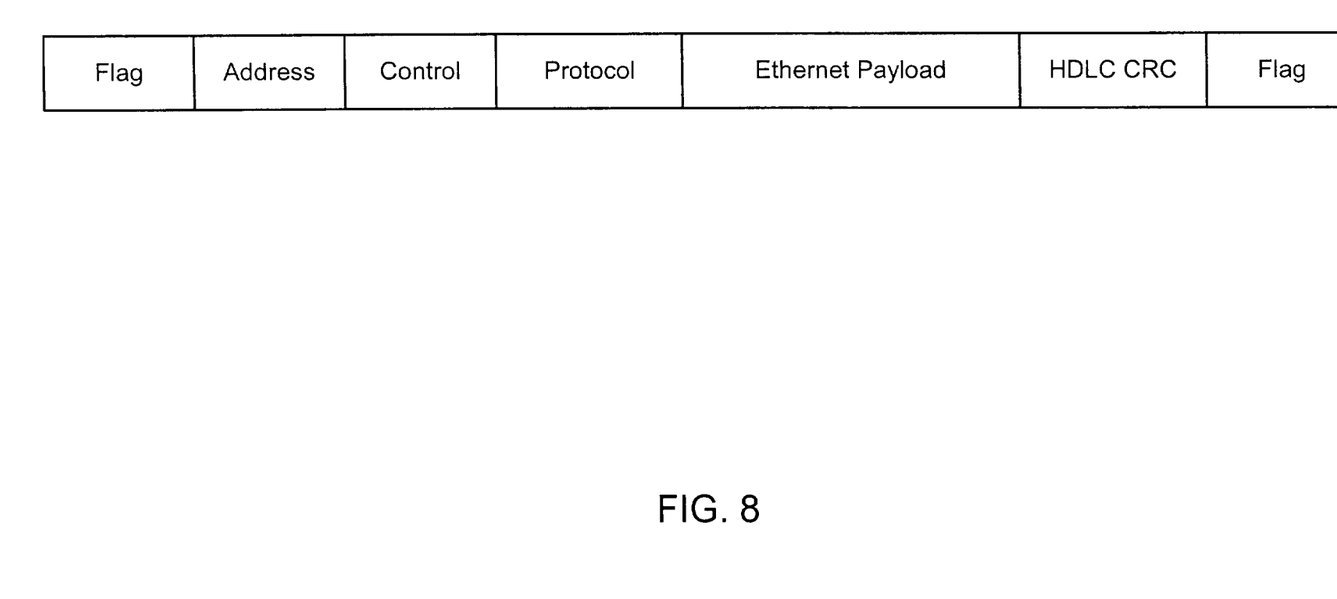
FIG. 8 illustrates an example of a frame format used by the system of FIG. 2.

FIG. 8 illustrates an example of a frame format used by the system described herein. The flag is an HDLC flag. The flag, address, and control fields carry 1 byte of data. The protocol field carries 2 bytes. The Ethernet payload may be any valid Ethernet frame plus 4 bytes Ethernet CRC. The HDLC CRC field contains 4 bytes. At the ingress card, 32 bit HDLC CRC is calculated over the entire Ethernet frame (including Ethernet CRC and padding bytes) and added to the end of the frame forwarded onto the Sonet path. Payload scrambling with byte stuffing (post scrambling) may be used on the frame (as described in RFC 2615 (PPP Over Sonet/SDH, A. Malis et al., June 1999)). It is to be understood that the format shown in FIG. 4 is only one example and that other formats may be used without departing from the scope of the invention. For example, Sonet frames other than HDLC may be used. Ethernet frames received at the ingress side of the Ethernet port are encapsulated according to the frame format described above and forwarded to the egress side of the port (FIG. 3).

Figure 9:
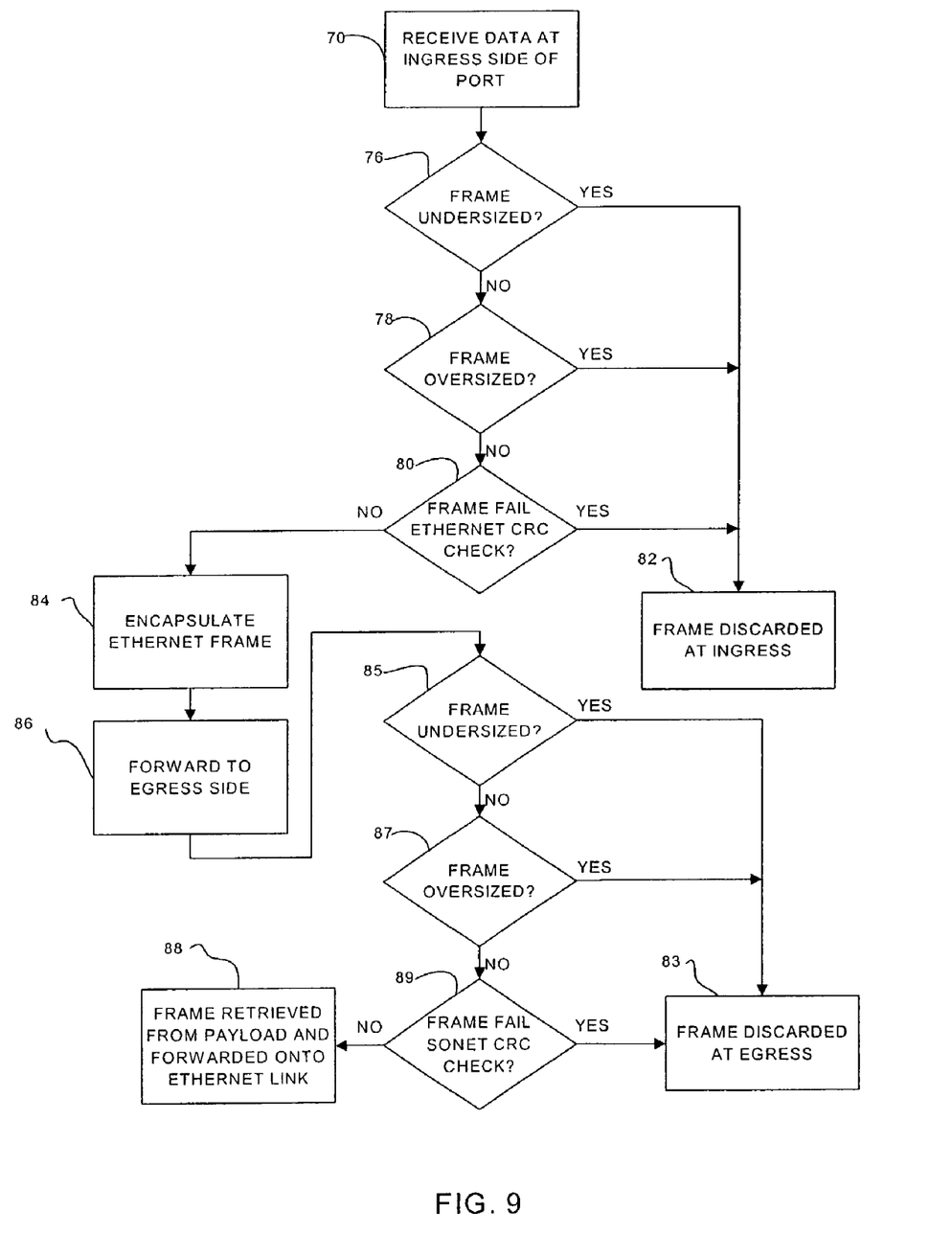
FIG. 9 is flowchart illustrating a process for emulating an Ethernet link over a Sonet path.

FIG. 9 is a flowchart illustrating a process for frame encapsulation and forwarding. Data is received at the ingress side of port 24 at step 70. Certain frames are discarded at the ingress port (step 82). These include, frames which are undersized (e.g., less than 64 bytes (standard minimum Ethernet frame requirement) (step 76). Also, frames which are oversized (e.g., greater than 1548 bytes (or 16K bytes, depending on the ingress card configuration) may be discarded (step 78). Frames which fail the Ethernet CRC check at the ingress port (i.e., received corrupted frames) will also be discarded, along with any other invalid Ethernet frames (step 80).

Valid Ethernet frames are encapsulated according to the frame format previously described at step 84. The encapsulated frames are forwarded to the egress side of the port at step 86. The frame may be discarded at the egress side of the port (step 83) if the frame is undersized (step 85), frame is oversized (step 87), or the frame fails a Sonet framing CRC check (step 89). The original frame is retrieved from the payload and forwarded onto the Ethernet link (step 88). This includes unicast, multicast, and broadcast Ethernet frames. Any Ethernet padding bytes as well as the 4 byte Ethernet CRC are carried end to end as part of the HDLC payload. The egress card uses the HDLC CRC for checking frame corruption over the Sonet path and strips the HDLC CRC bytes of valid frames before forwarding back out onto Ethernet. Frames which fail the HDLC CRC calculation are discarded at the egress port.

Figure 10:
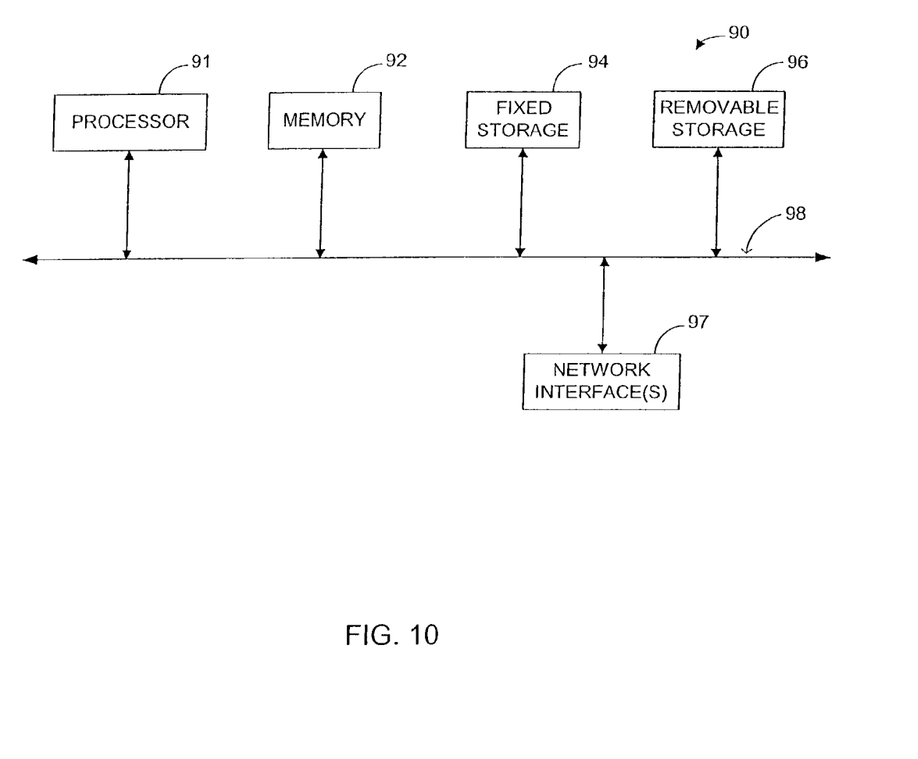
FIG. 10 is a system block diagram of a computer system that can be utilized to execute software of an embodiment of the present invention.

FIG. 10 shows a system block diagram of computer system 90 that may be used to execute software of an embodiment of the invention. The computer system 90 includes memory 92 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 90 further includes subsystems such as a central processor 91, fixed storage 94 (e.g., hard drive), removable storage 96 (e.g., CD-ROM drive), and one or more network interfaces 97. Other computer systems suitable for use with the invention may include additional or fewer subsystems. For example, computer system 90 may include more than one processor 91 (i.e., a multi-processor system) or a cache memory. The computer system 90 may also include a display, keyboard, and mouse (not shown) for use as a host.

The system bus architecture of computer system 90 is represented by arrows 98 in FIG. 10. However, these arrows are only illustrative of one possible interconnection scheme serving to link the subsystems. For example, a local bus may be utilized to connect the central processor 91 to the system memory 92. Computer system 90 shown in FIG. 10 is only one example of a computer system suitable for use with the invention. Other computer architectures having different configurations of subsystems may also be utilized. Communication between computers within the network is made possible with the use of communication protocols, which govern how computers exchange information over a network.

The system may also be implemented in hardware. Other embodiments such as an ASIC controller or state machine running microcode or an FPGA may be used.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for emulating an Ethernet link over a Sonet path and providing link integrity, the method comprising:

emulating an Ethernet link between a remote Ethernet port and a local Ethernet port for transporting Ethernet data, each of the remote and local Ethernet ports comprising a Sonet interface in communication with a Sonet path and an Ethernet interface in communication with an Ethernet link, the remote Ethernet port configured to transmit an error code identifying an incoming Ethernet link failure at the remote port, over a Sonet path in a Sonet path overhead upon detection of the incoming Ethernet link failure at the remote Ethernet port, the Sonet path comprising said emulated Ethernet link operable to transmit Ethernet link state during operation of the remote and local Ethernet ports with said incoming Ethernet link failure and without said incoming Ethernet link failure;

upon receiving the error code at the local Ethernet port, waiting a first specified period of time and disabling the local Ethernet port at said Ethernet interface only in an Ethernet transmit direction to an outgoing Ethernet link if the error code is still present after the first specified period of time, wherein communication continues from the local Ethernet port to the remote Ethernet port using said emulated Ethernet link to provide Ethernet link integrity and said Ethernet link state after disabling the local Ethernet port; and upon detecting a Sonet path failure at said Sonet interface of the local Ethernet port, waiting a second specified period of time and entering a link down state in which the local Ethernet port is disabled in said Ethernet transmit direction and an Ethernet receive direction if the Sonet path failure is still present.

2. The method of claim 1 further comprising enabling the local Ethernet port upon removal of the error code and continuing to transmit data over said emulated Ethernet link utilizing the same format used to transmit said data when said error code was present.

3. The method of claim 2 further comprising waiting a third specified period of time after removal of the error code and before enabling the local Ethernet port.

4. The method of claim 1 further comprising encapsulating an Ethernet frame comprising said Ethernet link state and transmitting said encapsulated frame over the Sonet path.

5. The method of claim 4 further comprising discarding frames not falling within a predetermined byte size.

6. The method of claim 4 further comprising discarding frames failing a CRC calculation.

7. The method of claim 1 further comprising utilizing HDLC CRC to check frame corruption over the Sonet path and discarding frames which are corrupted.

8. The method of claim 1 wherein the error code is inserted in a user level messaging portion of the Sonet overhead.

9. The method of claim 1 further comprising detecting an error free Sonet circuit and enabling the Ethernet port in both directions.

10. The method of claim 9 further comprising waiting a third specified period of time before enabling the Ethernet port, wherein at least two of said first, second, and third specified periods of time are different from one another.

11. The method of claim 1 wherein the second specified period of time accounts for transient Sonet error conditions and for extended ring network configurations.

12. The method of claim 1 wherein detecting a Sonet path failure comprises receiving an alarm indication signal.

13. The method of claim 1 wherein said error code received at the local Ethernet port upon detection of an Ethernet link failure is located in a different section of a Sonet frame than an indication received for a Sonet path failure.

14. A method for emulating an Ethernet link over a Sonet path, the method comprising:

detecting an incoming Ethernet link failure at a local Ethernet port coupled to a Sonet path;

encapsulating an Ethernet frame at the local Ethernet port, said Ethernet frame comprising an indication of the state of the local Ethernet port;

transparently passing said Ethernet frame over said Sonet path in a generally unaltered condition from the local Ethernet port to the remote Ethernet port configured to decapsulate said Ethernet frame;

transmitting an error code to the remote Ethernet port in a Sonet path overhead, over said Sonet path upon detection of an incoming Ethernet link failure at the local Ethernet port;

continuing to transmit Ethernet frames comprising said indication of the state of the local Ethernet port over said Sonet path following transmittal of said error code; and continuing to receive Ethernet frames comprising an indication of the state of the remote Ethernet port following transmittal of said error code, said received Ethernet frames in the same format as said Ethernet frames received before transmitting said error code.

15. The method of claim 14 further comprising providing flow control by matching an Ethernet data transmittal speed to a speed of data transmittal over the Sonet path.

16. The method of claim 14 further comprising:
detecting a Sonet path failure at the local Ethernet port;
waiting a specified period of time; and
disabling Ethernet input traffic into the Sonet path.

17. A system for emulating an ethernet link over a Sonet path, the system comprising:

a local Ethernet port having an ingress side coupled to an Ethernet link and an egress side coupled to a Sonet path; and a processor configured to:

receive an error code detection of an incoming Ethernet link failure at a remote Ethernet port, said error code being transmitted over the Sonet path in a Sonet path overhead, the Sonet path comprising an emulated Ethernet link operable to transmit the error codes and link state during operation of the remote and local Ethernet ports, wait a first specified period of time, and disable the local Ethernet port in only an Ethernet transmit direction if the error code is still present after the specified period of time, wherein communication continues from the local Ethernet port to the remote Ethernet port using said emulated Ethernet link to provide Ethernet link integrity and Ethernet link state after disabling the local Ethernet port; and detect a Sonet path failure, wait a second specified period of time, and enter a link down state in which the local Ethernet port is disabled in said Ethernet transmit direction and an Ethernet receive direction, if the Sonet path failure is still present; and memory for storing a state of the local Ethernet port and the remote Ethernet port;

wherein the processor is configured to transition said state of the local Ethernet port based on a current state and receipt of said error code or detection of said Sonet path failure.

18. The system of claim 17 wherein the processor is configured to encapsulate frames received at the ingress side and forward the encapsulated frames to the egress side and onto the Ethernet link.

19. The system of claim 17 wherein the processor is configured to provide frame buffering to facilitate over-subscription.

20. A computer readable storage medium storing computer executable code for emulating an Ethernet link over a Sonet path, the code comprising:

code that emulates an Ethernet link between a remote Ethernet port and a local Ethernet port for transporting Ethernet data, each of the remote and local Ethernet ports comprising a Sonet interface in communication with a Sonet path and an Ethernet interface in communication with an Ethernet link, the remote Ethernet port configured to transmit an error code identifying an incoming Ethernet link failure at the remote port, over a Sonet path in a Sonet path overhead upon detection of the incoming Ethernet link failure at the remote Ethernet port, the Sonet path comprising said emulated Ethernet link operable to transmit Ethernet link state during operation of the remote and local Ethernet ports with said incoming Ethernet link failure and without said incoming Ethernet link failure;

code that upon receiving the error code at the local Ethernet port, waits a specified period of time and disables only the local Ethernet port at said Ethernet interface only in an Ethernet transmit direction to an outgoing Ethernet link if the error code is still present after the specified period of time, wherein communication continues from the local Ethernet port to the remote Ethernet port using said emulated Ethernet link to provide Ethernet link integrity and said Ethernet link state after disabling the local Ethernet port; and code that upon detection of a Sonet path failure at said Sonet interface of the local Ethernet port, waits a second specified period of time and instructs the local Ethernet port to enter a link down state in which the local Ethernet port is disabled in said Ethernet transmit direction and an Ethernet receive direction if the Sonet path failure is still present.

* * * * *

UNITED STATES PATENT AND TRADEMARK OFFICE
CERTIFICATE OF CORRECTION

| | | |
|---|---|---|
| PATENT NO. | : 7,653,526 B1 | Page 1 of 1 |
| APPLICATION NO. | : 10/222134 | |
| DATED | : January 26, 2010 | |
| INVENTOR(S) | : Ryle et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-eighth Day of December, 2010

David J. Kappos
*Director of the United States Patent and Trademark Office*